No. 788,087. PATENTED APR. 25, 1905.
A. BENEDETTO.
CYLINDER JACKET.
APPLICATION FILED JAN. 12, 1905.

Witnesses.
John Callahan
Andrew Marganiu

Inventor.
Antonio Benedetto.

No. 788,087. Patented April 25, 1905.

UNITED STATES PATENT OFFICE.

ANTONIO BENEDETTO, OF WASHINGTON, DISTRICT OF COLUMBIA.

CYLINDER-JACKET.

SPECIFICATION forming part of Letters Patent No. 788,087, dated April 25, 1905.

Application filed January 12, 1905. Serial No. 240,745.

*To all whom it may concern:*

Be it known that I, ANTONIO BENEDETTO, a citizen of the United States, residing at Washington, District of Columbia, have invented an Improvement in Cylinder-Jackets for Steam-Engines, of which the following is a specification.

My invention relates to a new form of jacket for steam-engines; and the object of my invention is to provide a means to keep a high temperature externally to the steam-cylinders and to the steam-passages in multiple-expansion vibratory steam-engines in order to prevent condensation of water in the steam-cylinders. I attain this object by the mechanism illustrated in the accompanying drawings, in which—

Figure 1:
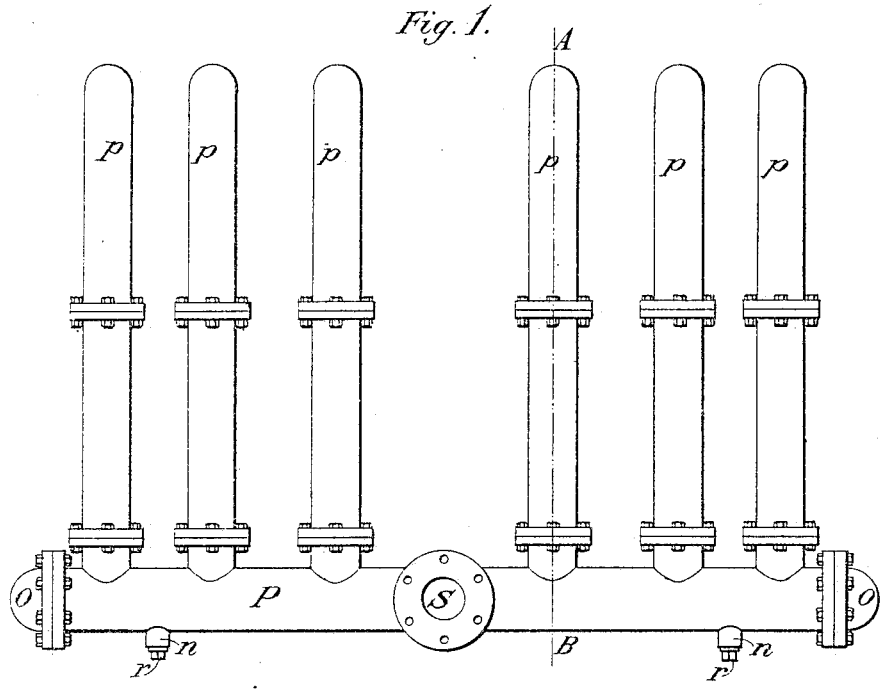
Figure 2:
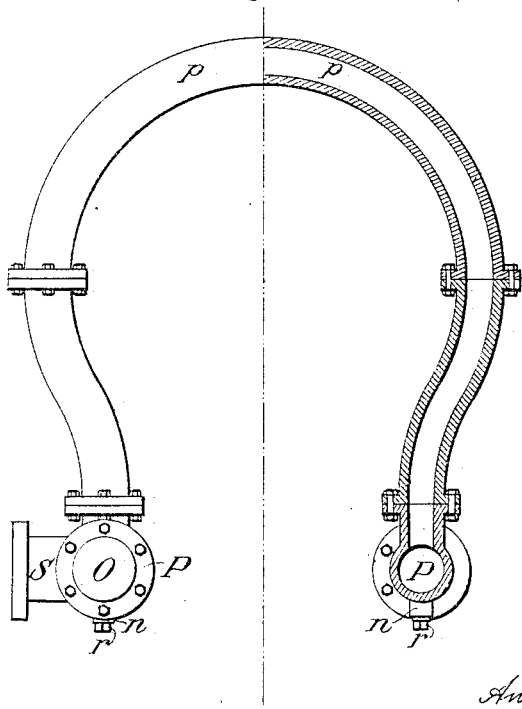

Figure 1 shows the longitudinal elevation of the jacket. Fig. 2 on the left-hand side shows the side elevation and on the right-hand side shows a section according to A B, Fig. 1.

Similar letters refer to similar parts throughout the drawings.

The jacket consists of two longitudinal pipes P P, which have an interval between them and are closed at the extremities by the removable heads O. These two parallel longitudinal pipes communicate with each other by means of a series of transversal pipes $p$, which have a shape conforming to the periphery of the steam-cylinders of the engine in order to surround the said steam-cylinders and the steam-passages. When steam is used for heating purpose, one of the longitudinal pipes P is to be connected to the main steam-pipe by means of the joint S, leaving the other pipe P closed, and each one of these pipes is also provided with one or more openings $n$ at the lower part of them for the steam-traps, which openings may be closed up by removable plugs $r$. When hot gases from the furnace or from other sources are used for heating purpose, the inlet S will be connected to the heating-supply and the heads O at the extremities of the other longitudinal pipe will be removed, connecting these extremities to pipes leading the hot gases to the atmosphere.

Having described my invention, what I claim is—

A cylinder-jacket for a steam-engine, consisting of two parallel longitudinal pipes closed at the extremities by removable heads, said pipes separated by some interval between them and communicating with each other by means of a series of pipes having a curved shape, conforming to the periphery of the steam-cylinders of the engine, one of said longitudinal pipes provided with a joint or inlet to be connected to the main steam-pipe or to the heating-supply, and each longitudinal pipe provided at the lower part with openings for steam-traps, which openings are provided with removable plugs, substantially as specified.

In testimony whereof I have signed my name to this specification in presence of two subscribing witnesses.

ANTONIO BENEDETTO.

Witnesses:
   JOHN CALLAHAN,
   ANDREW WARGANIN.